W. STOCK.
FLOAT VALVE.
APPLICATION FILED JUNE 19, 1911.
1,032,308.
Patented July 9, 1912.
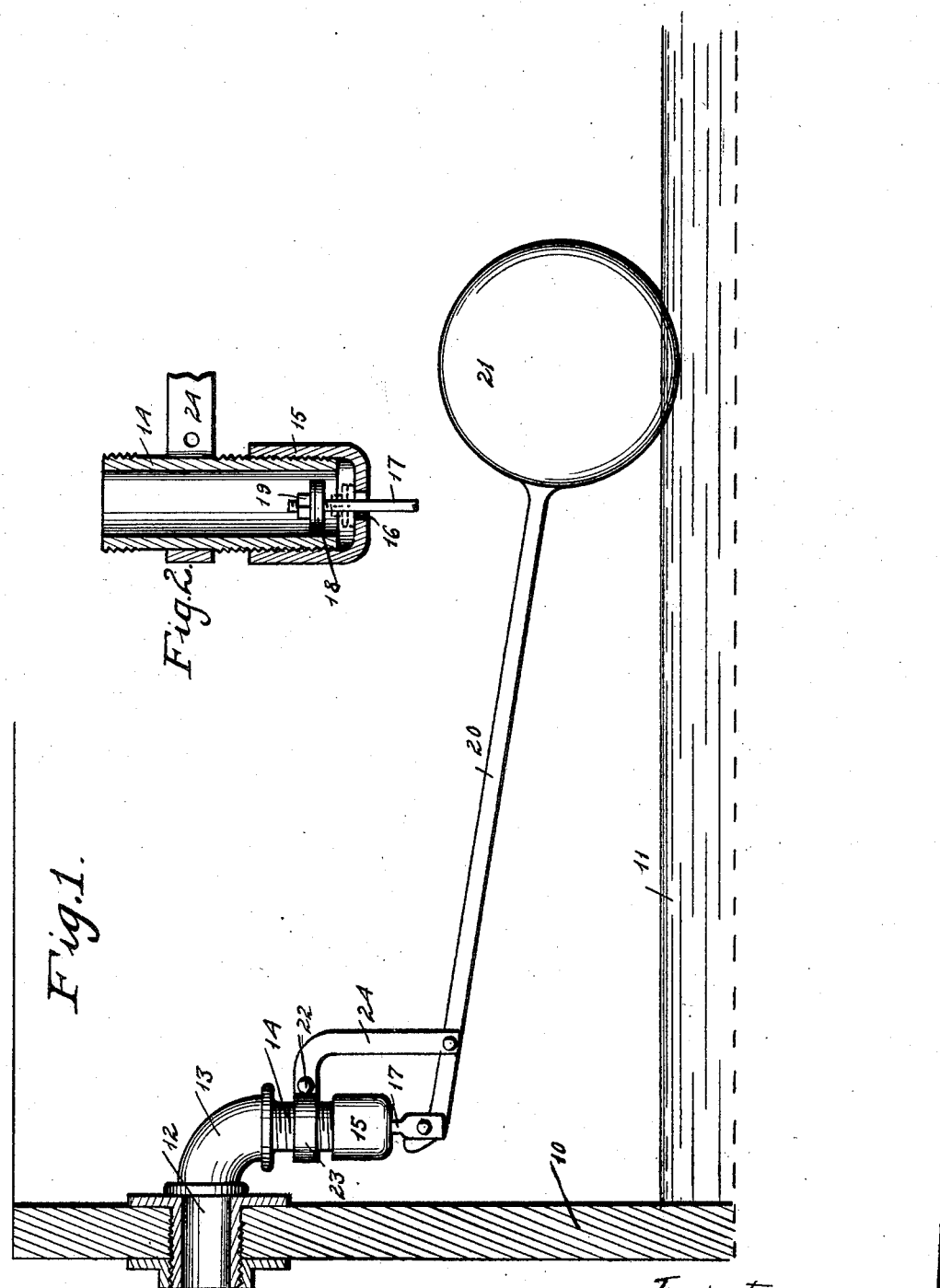

UNITED STATES PATENT OFFICE.

WILLIAM STOCK, OF BAXTER, IOWA.

FLOAT-VALVE.

1,032,308.  Specification of Letters Patent.  Patented July 9, 1912.

Application filed June 19, 1911. Serial No. 634,161.

*To all whom it may concern:*

Be it known that I, WILLIAM STOCK, a citizen of the United States, residing at Baxter, in the county of Jasper and State of Iowa, have invented a certain new and useful Float-Valve, of which the following is a specification.

The object of my invention is to provide a float valve of extremely inexpensive and simple construction for use with vessels where it is desired to maintain the liquid therein at approximately the same level.

A further object of my invention is to provide such a valve in which the position of the float with reference to the valve proper, is made adjustable by simple and inexpensive means.

A further object is to provide a float valve having very few and simple parts in which the valve seat is formed of an ordinary screw cap.

My invention consists in certain details, in the construction, arrangement and combination of the various parts of the device, whereby the objects contemplated are attained, as hereinafter more fully set forth, pointed out in my claim and illustrated in the accompanying drawings, in which—

Figure 1 shows a side elevation of a float valve involving my invention, and Fig. 2 shows a vertical, sectional view of the valve proper and the valve seat.

My valve is particularly designed for use with a series of water troughs in a barn or the like, where it is desirable to keep the water troughs automatically filled when horses or other animals drink therefrom. It is therefore seen that the simplicity and cheapness thereof is highly important. I ordinarily place the valve in a closed receptacle which communicates by ordinary pipes with troughs from which animals drink, said troughs being at approximately the same level as the receptacle.

In the accompanying drawings, I have used the reference numeral 10 to indicate a portion of the frame of the receptacle which is partially filled with water 11. Communicating with the interior of the frame is an ordinary intake pipe 12 connected with which on the inside of the receptacle is an elbow 13. A short length of pipe 14 extends downwardly from the elbow 13, and a screw cap 15 of ordinary construction is secured to the lower end of the pipe 14. The screw cap 15 is provided with a central opening 16 in which is slidingly received a rod 17. On the rod 17 within the pipe 14, are one or more disks 18 of leather or other suitable material for closing the valve opening. The disks 18 are held on the rod 17 by an ordinary nut 19. Pivotally secured to the lower end of the rod 17 is an arm 20 on the free end of which is an ordinary float 21. I provide a bracket for securing the arm 20 to the pipe 14 constructed as follows: An ordinary piece of strap iron is bent at its middle to form a circular portion 23, the diameter of which is sufficient to receive the pipe 14. The two sides of the bracket thus formed are secured together at a point adjacent to the pipe 14 by means of an ordinary screw threaded bolt 22 having a nut thereon not shown in the drawing. The free ends 24 of the strap iron which forms the bracket are then bent downwardly and pivotally secured to the arm 20. It will be seen that the position of the arm 20 with reference to the cap 15 and the pipe 14 may be changed by loosening the bolt 22 and moving the portion 23 upwardly or downwardly on the pipe 14. The arm 20 may be extended in any desired direction from the pipe 14 by loosening the bolt 22 and rotating the portion 23 on the pipe 14.

It will be understood that in practical operation, the intake pipe 12 is supplied with water under some pressure. When the float 21 is in the lower position of its movement, the disk 18 is raised above the opening 16 and water flows readily into the receptacle. As the water flows into the receptacle, the float 21 is gradually raised and the flow of water into the receptacle decreased. When the water has reached a certain height within the receptacle, the float 21 is raised until the disk 18 is held tightly over the opening 16 and the flow of incoming water is automatically stopped. When the level of the water is lowered by removing said water in any way from the receptacle, the float 21 is lowered and the disk 18 is raised above the opening 16 permitting the inflow of more water.

The extreme cheapness and simplicity of my device is now apparent. Ordinary piping is used and the valve seat is composed of an ordinary screw cap with a central opening therein. The bracket for securing the arm 20 in proper position is simple and inexpensive in construction, and is fully adjustable. It is to be noted in this connection that the cap 15 is of sufficient depth so that it may be adjusted longitudinally on the pipe 14 and the relative location of the valve seat may thus be varied.

I claim as my invention:

A device of the class described, designed for use with a receptacle for water, comprising an intake pipe, an elbow thereon, a pipe extending downwardly from said elbow, a screw cap on the lower end of said downwardly extending pipe constructed with a central opening, said cap being of sufficient length to permit a longitudinal adjustment thereof with relation to the pipe on which it is fixed, the inner surface of said cap forming a valve seat around said opening, a vertical rod slidably mounted in the opening in said cap, a disk of suitable material on said rod within said cap designed to form a valve resting in one position of its movement on said valve seat, a substantially horizontal arm pivotally secured to the lower end of said rod, a float on the free end of said arm, and a bracket comprised of a single piece of strap iron having one end bent around said downwardly extending pipe and the other end extended downwardly and pivotally secured to said arm, a screw threaded bolt securing said first named end of said piece to the body thereof, said bracket being thus circumferentially and longitudinally adjustable on said pipe.

Des Moines, Iowa, June 12, 1911.

WILLIAM STOCK.

Witnesses:
O. E. CUNNINGHAM,
A. G. KRACHT.

---

Copies of this patent may be obtained for five cents each, by addressing the "Commissioner of Patents, Washington, D. C."